US010334001B2

(12) United States Patent
Liu et al.

(10) Patent No.: US 10,334,001 B2
(45) Date of Patent: Jun. 25, 2019

(54) TECHNIQUES FOR IMPLEMENTING TELEPHONE CALL BACK FOR A MULTIMEDIA CONFERENCING PLATFORM

(71) Applicant: CISCO TECHNOLOGY, INC., San Jose, CA (US)

(72) Inventors: Yanghua Liu, San Jose, CA (US); Don D. Brown, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 203 days.

(21) Appl. No.: 15/253,590

(22) Filed: Aug. 31, 2016

(65) Prior Publication Data

US 2018/0063207 A1   Mar. 1, 2018

(51) Int. Cl.

| H04L 12/16 | (2006.01) |
|---|---|
| H04Q 11/00 | (2006.01) |
| H04L 29/06 | (2006.01) |
| H04W 12/02 | (2009.01) |
| H04W 12/06 | (2009.01) |
| H04L 29/08 | (2006.01) |

(52) U.S. Cl.
CPC .......... *H04L 65/403* (2013.01); *H04L 63/02* (2013.01); *H04L 63/0428* (2013.01); *H04L 65/1069* (2013.01); *H04L 65/1096* (2013.01); *H04W 12/02* (2013.01); *H04L 63/08* (2013.01); *H04L 67/02* (2013.01); *H04W 12/06* (2013.01)

(58) Field of Classification Search
CPC .............. H04L 65/403; H04L 63/0209; H04L 63/0428; H04L 63/08; H04L 65/1069; H04W 12/06

See application file for complete search history.

(56) References Cited

U.S. PATENT DOCUMENTS

| 6,282,278 | B1* | 8/2001 | Doganata | .............. H04M 3/563 379/202.01 |
|---|---|---|---|---|
| 6,813,714 | B1* | 11/2004 | Hardjono | .............. H04L 63/062 380/277 |
| 6,889,321 | B1* | 5/2005 | Kung | ................ H04L 29/06027 348/E7.056 |
| 7,426,192 | B2* | 9/2008 | Amano | .................. G06Q 30/02 370/260 |
| 7,716,109 | B1* | 5/2010 | Jacobs | .................... G06Q 20/10 705/35 |
| 8,379,822 | B2* | 2/2013 | Keohane | ................. H04M 3/56 370/261 |
| 8,547,963 | B2* | 10/2013 | Lin | ..................... H04L 65/1069 370/352 |

(Continued)

*Primary Examiner* — Stephen M D Agosta

(57) ABSTRACT

A method is described and in one embodiment includes receiving a request to participate in a web-based conferencing session using an IP phone, wherein the web-based conferencing session is hosted by a server; establishing an encrypted connection to the server; requesting network routing information for the IP phone from a call manager; receiving from the call manager the requested routing information; and establishing a connection with the IP phone using the received routing information. The method may further include embodiments in which the request to participate in the web-based conferencing session is initiated by a user via a client application executing on a computer device and in which the encrypted connection is established over an Internet.

20 Claims, 9 Drawing Sheets

(56) References Cited

U.S. PATENT DOCUMENTS

| | | | |
|---|---|---|---|
| 8,896,659 B2* | 11/2014 | Pang | H04M 3/42195 348/14.08 |
| 2002/0184349 A1* | 12/2002 | Manukyan | G06F 9/44505 709/221 |
| 2003/0021264 A1* | 1/2003 | Zhakov | H04L 29/06027 370/352 |
| 2003/0158900 A1* | 8/2003 | Santos | H04M 3/567 709/205 |
| 2005/0108328 A1* | 5/2005 | Berkeland | H04L 12/1822 709/204 |
| 2005/0152338 A1* | 7/2005 | Chen | H04M 1/2535 370/352 |
| 2006/0239252 A1* | 10/2006 | Kantak | H04M 7/1205 370/352 |
| 2007/0041366 A1* | 2/2007 | Vugenfirer | H04M 3/561 370/352 |
| 2007/0153736 A1* | 7/2007 | Mow | H04M 3/54 370/331 |
| 2007/0156811 A1* | 7/2007 | Jain | H04L 12/1827 709/204 |
| 2007/0160076 A1 | 7/2007 | Faber et al. | |
| 2007/0230449 A1* | 10/2007 | Arai | H04M 1/247 370/352 |
| 2007/0286178 A1* | 12/2007 | Kakiuchi | H04M 1/2473 370/356 |
| 2008/0207190 A1 | 8/2008 | Altberg et al. | |
| 2009/0220064 A1* | 9/2009 | Gorti | H04M 3/56 379/202.01 |
| 2010/0034367 A1 | 2/2010 | Das et al. | |
| 2010/0098230 A1* | 4/2010 | Bhow | H04L 12/1818 379/202.01 |
| 2012/0226997 A1* | 9/2012 | Pang | H04L 65/4038 715/753 |
| 2013/0110570 A1 | 5/2013 | Ament | |
| 2013/0243177 A1 | 9/2013 | Altberg et al. | |
| 2013/0343232 A1* | 12/2013 | Terpstra | H04L 65/403 370/260 |
| 2014/0201275 A1* | 7/2014 | Huang | H04L 65/403 709/204 |
| 2014/0241515 A1* | 8/2014 | Oswal | H04M 3/56 379/93.01 |
| 2014/0359733 A1* | 12/2014 | Marquez | H04L 9/3228 726/6 |
| 2015/0085057 A1* | 3/2015 | Ouyang | H04N 7/15 348/14.02 |
| 2015/0088572 A1* | 3/2015 | Mai | G06Q 10/1093 705/7.18 |
| 2016/0065735 A1 | 3/2016 | Pott et al. | |
| 2017/0289266 A1* | 10/2017 | Rauenbuehler | H04L 67/141 |

* cited by examiner

TECHNIQUES FOR IMPLEMENTING TELEPHONE CALL BACK FOR A MULTIMEDIA CONFERENCING PLATFORM

TECHNICAL FIELD

This disclosure relates in general to the field of communications networks and, more particularly, to techniques for implementing telephone call back for a multimedia conferencing platform in the field of communications networks.

BACKGROUND

When users are invited to participate in a multimedia conferencing session, for example, via Cisco's WebEx, there may be several ways in which they may join the audio portion of the conference. Many users prefer to use a telephone as opposed to computer audio, for example, if they prefer not to use headsets or don't have good headsets. For telephone users, call back may be a preferred option because it is easy to use and there are very few buttons that must be pressed; however, the call back option is typically more expensive to implement as compared to the call in option due to the fact that a telephony network is involved.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS

Overview

A method is described and in one embodiment includes receiving a request to participate in a web-based conferencing session using an IP phone, wherein the web-based conferencing session is hosted by a server; establishing an encrypted connection to the server; requesting network routing information for the IP phone from a call manager; receiving from the call manager the requested routing information; and establishing a connection with the IP phone using the received routing information. In some embodiments, the request to participate in the web-based conferencing session is initiated by a user via a client application executing on a computer device. In other embodiments, the encrypted connection is established over an Internet. The method may further include providing connecting the IP phone to the web-based server via a client application executing on a computer device.

In some embodiments, the server comprises an audio/video server disposed in a collaboration cloud environment. In certain embodiments, the IP phone is disposed on an opposite side of a firewall from the audio/video server. The method may further include, prior to establishing a connection with the IP phone, checking credentials of a user associated with the request to participate in the web-based conferencing session to determine whether the user is authorized to join the web-based conferencing session.

Example Embodiments

When users participate in a multimedia platform conferencing session, audio is a very important part of the conference. Many users continue to use a telephone to connect to the audio portion of the conference. Call back is a preferred way for some users to connect primarily due to the fact that it is simple and secure and there is no need to key in the conference and meeting numbers. A call back option is typically more expensive to implement than a call in option. Embodiments described herein propose an innovative way to support a lower cost call back option for users of an enterprise with a call manager function, such as Cisco Unified Call Manager ("CUCM"), installed within the enterprise.

Figure 1:
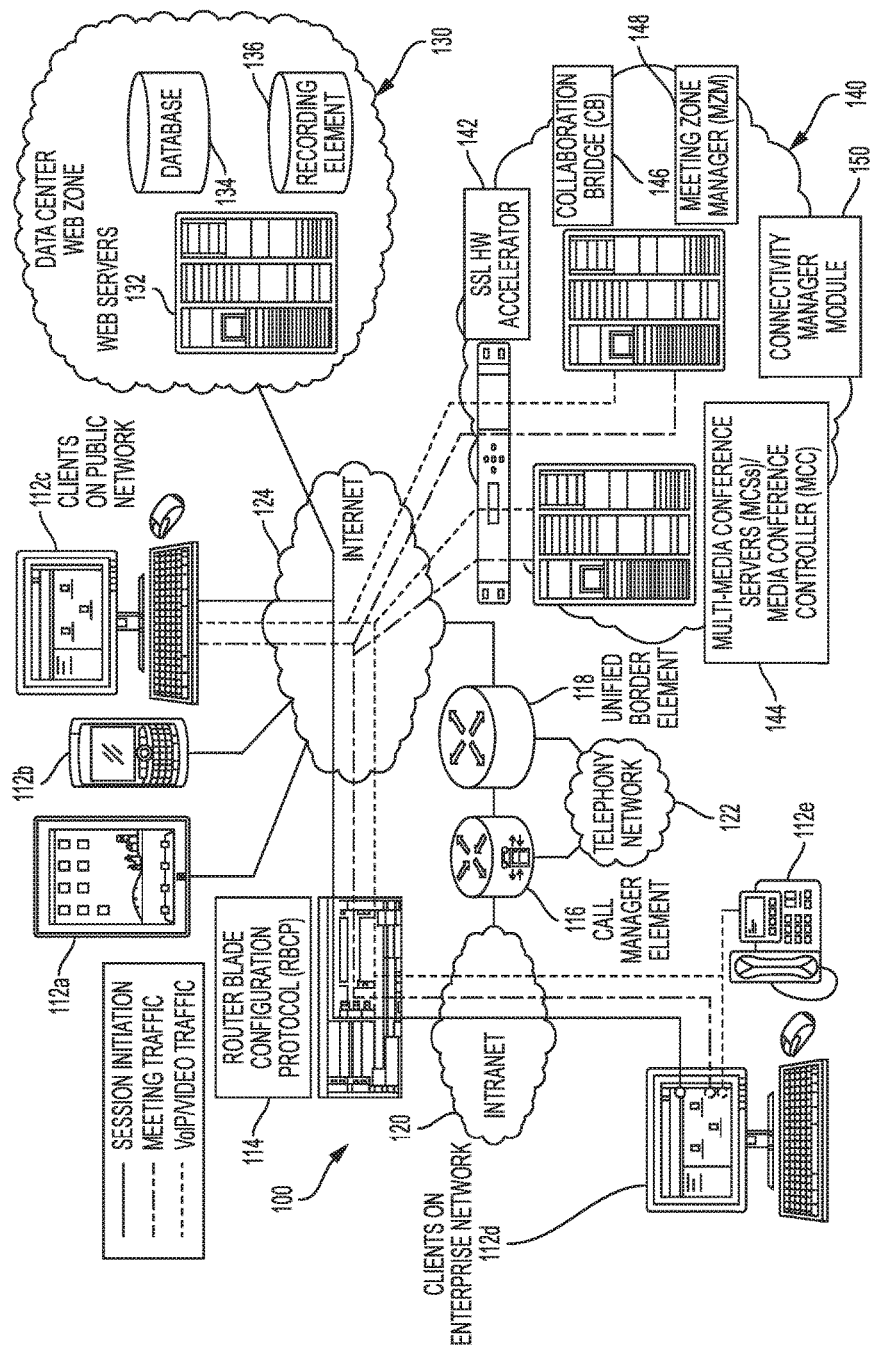
FIG. 1 is a simplified schematic diagram of a communication system for implementing telephone call back for a multimedia conferencing platform in accordance with one embodiment of the present disclosure.

FIG. 1 is a simplified block diagram illustrating a communication system 100 in which techniques for performing telephone call back for a multimedia conferencing platform may be implemented. In specific implementations, communication system 100 can be provisioned for use in generating, managing, hosting, and/or otherwise providing virtual meetings. In certain scenarios (many of which are detailed below), communication system 100 may be configured for performing telephone call back for a multimedia conferencing platform in accordance with embodiments described herein. The architecture of communication system 100 is applicable to any type of conferencing or meeting technology such as video conferencing architectures (e.g., Telepresence1, web cam configurations, smartphone deployments, personal computing applications (e.g., Skype™), multimedia meeting platforms (e.g., MeetingPlace™, WebEx™, other virtual meeting client, etc.), desktop applications, or any other suitable environment in which video data is sought to be managed.

Communication system 100 may include any number of endpoints 112a-e that can achieve suitable network connectivity via various points of attachment. In this particular example, communication system 100 can include an Intranet 120, a telephony network 122, and an Internet 124, which (in this particular example) offers a pathway to a data center web zone 130 and a data center meeting zone 140. Telephony network 122 may include, among other things, a voice over Internet protocol (VoIP) gateway and a public switched telephone network (PSTN).

Data center web zone 130 includes a plurality of web servers 132, a database 134, and a recording element 136. Data center meeting zone 140 may include a secure sockets layer hardware (SSL HW) accelerator 142, a plurality of multimedia conference servers (MCSs)/media conference controller (MCC) 144, a collaboration bridge 146, a meeting zone manager 148, and a connectivity manager module 150. As a general proposition, each MCS can be configured to coordinate video and voice traffic for a given online meeting. Additionally, each MCC can be configured to manage the MCS from data center meeting zone 140. Each of endpoints 112*a-e* can be provisioned with one or more virtual meeting applications. A virtual meeting application may comprise, e.g., a virtual meeting client, a connectivity manager module, or both (operably coupled to one another). A virtual meeting client is operable (e.g., by an endpoint) to establish a connection to a virtual meeting session. The connectivity manager module is operable to facilitate connections and data transfer with between endpoints.

Note that various types of routers and switches can be used to facilitate communications amongst any of the elements of FIG. 1. For example, a call manager element 116 and a unified border element 118 can be provisioned between telephony network 122 and Intranet 120. The call manager element is a network manager for IP phones. Also depicted in FIG. 1 are a number of pathways (e.g., shown as solid or broken lines) between the elements for propagating meeting traffic, session initiation, and voice over Internet protocol (VoIP)/video traffic.

In the exemplary enterprise system of FIG. 1, the call manager element 116 may dynamically assign a phone number to one or more phones (e.g., VoIP phones). After a phone number is assigned to a phone, any call placed to the phone number will be effective to establish telephonic contact with the phone to which the number is assigned (at least until the number is unassigned from the phone). After a phone number is unassigned from a phone, any call placed to the phone number will not be effective to establish telephonic contact with the phone. In an example, a phone number may be assigned to more than one phone. In this case, calling (or initiating a call to) the phone number, results in initiating telephonic contact with each of the devices that have been assigned the number. The call manager element may change the number periodically based on a number of factors (e.g., change number based on time of day, based on a user detected nearby the device, etc.). If the phone number changes, the call manager may generate and transmit a message containing a new number to the VoIP phone.

Figure 2:
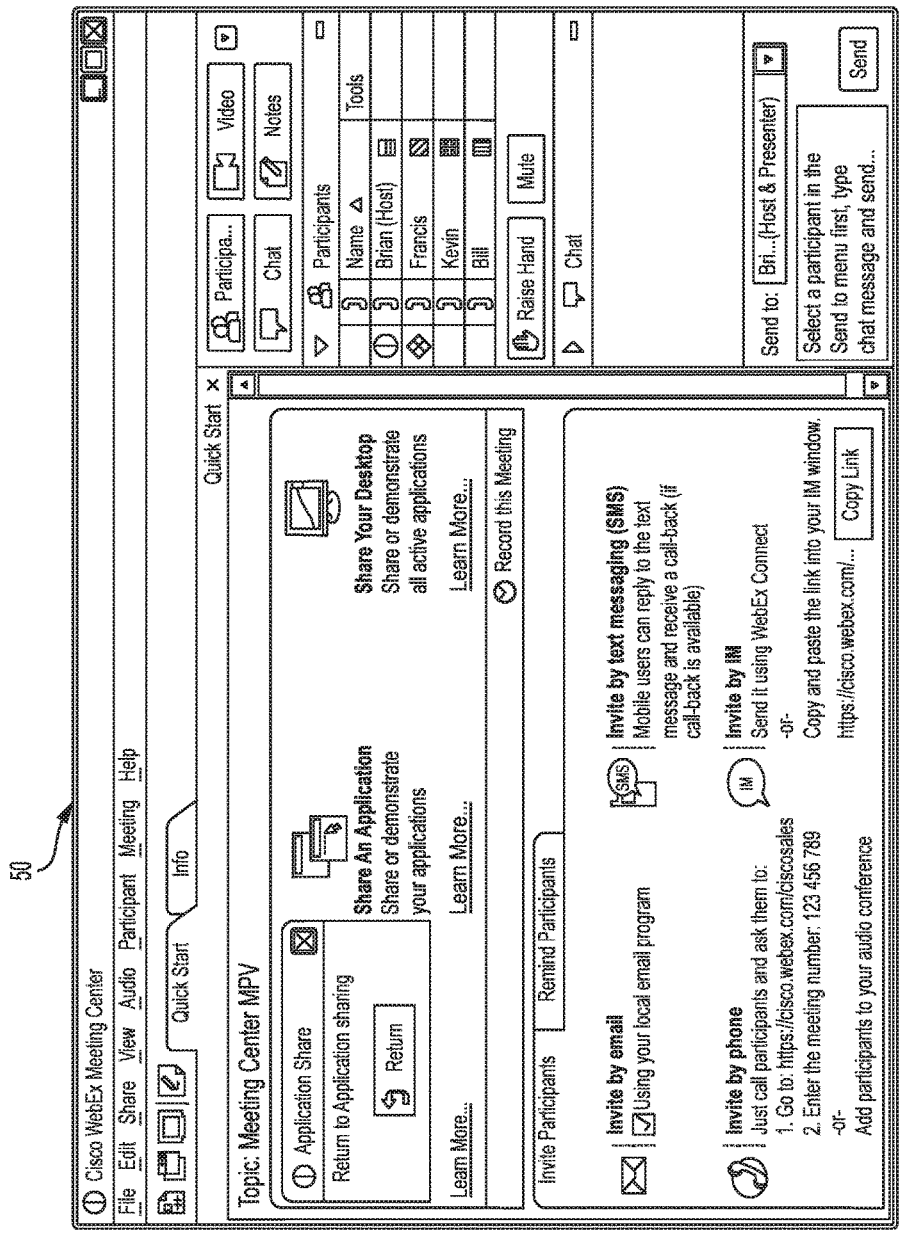
FIG. 2-3 respectively illustrate simplified schematic diagrams showing example user interface graphics associated with possible implementations of the communication system.
Figure 3:
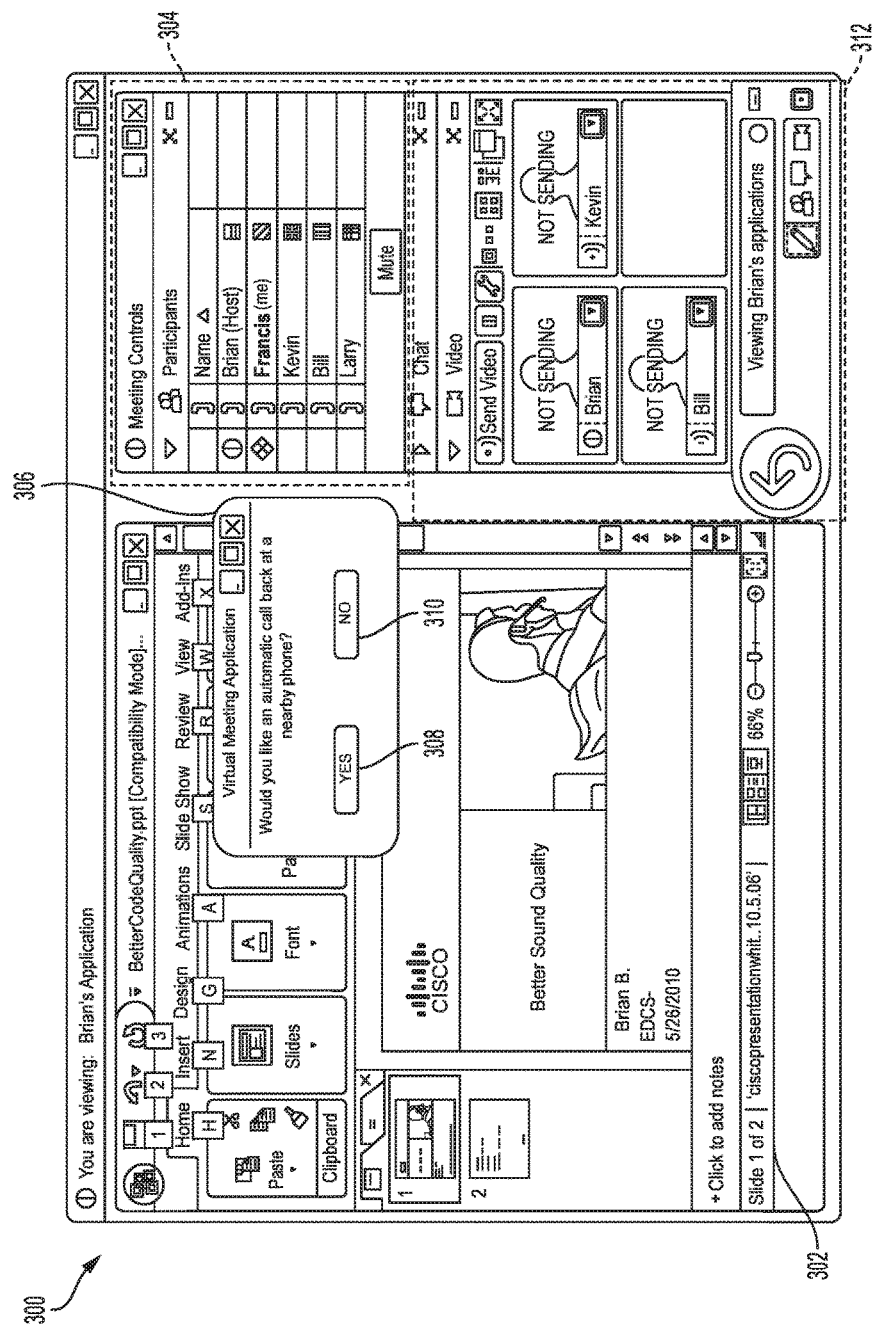

FIGS. 2-3 illustrate simplified schematic diagrams illustrating example user interface graphics associated with one possible implementation of communication system 100. Turning specifically to FIG. 2, FIG. 2 is a simplified schematic diagram 200 associated with an example interface for conducting a virtual meeting using a virtual meeting application. This particular example relates to a virtual meeting initiation, specifically as the virtual meeting experience begins. FIG. 3 is a simplified schematic diagram 300 illustrating one example scenario in which a particular meeting participant is sharing a PowerPoint presentation during a virtual meeting. This participant can freely share his desktop such that other meeting participants can observe information that is resident on his local machine.

Semantically, the virtual meeting application is a client and server application. In some embodiments, the virtual meeting application may be a web-based application. A client module can be loaded onto an end user's endpoint via one or more webpages. A software module (e.g., a plug-in application or a stand-alone application) can be delivered to a respective endpoint via the webpages. The software can be downloaded (or suitably updated) before participating in the meeting. If the software module is already resident on the end user's endpoint (e.g., previously downloaded, provisioned through any other type of medium (e.g., compact disk (CD))), then while attempting to participate in a virtual meeting, that software module would be called to run locally on the endpoint. This allows a given endpoint to establish a communication with one or more servers (e.g., provisioned at data center meeting zone 140 and/or data center web zone 130).

Static data can be stored in data center web zone 130. For example, the scheduling data, the login information, the branding for a particular company, the schedule of the day's events, etc. can all be provided in data center web zone 130. Once the meeting has begun, any meeting experience information can be coordinated (and stored) in data center meeting zone 140. For example, if an individual were to share a document, or to pass the ball (i.e., pass control of the meeting), then that meeting experience would be managed by data center meeting zone 140. In a particular implementation, data center meeting zone 140 is configured to coordinate the various activities with endpoints 112*a-e* (e.g., via software modules).

In order to initiate joining a virtual meeting, an endpoint may connect to any point of attachment. Hence, a client (e.g., a virtual meeting client) can perform appropriate operations to join a previously scheduled virtual meeting. The endpoint can be redirected to data center meeting zone 140 (as shown in FIG. 1). The meeting zone manager 148 can direct the endpoint to connect to a specific collaboration bridge server for joining the upcoming meeting. If the meeting has VoIP/video streams, then the endpoint also connects to a given server (e.g., an MCS) to receive those streams. The client is operably connected to the meeting (i.e., has completed joining the meeting) when client connected only by voice, only by video, or by integrated voice and video. Operationally, when the client joins the virtual meeting (e.g., and launches integrated voice and video) there are two connections being established to the collaboration bridge and to the MCS. For the collaboration bridge, one connection is established to send data and a second connection is established to receive data. For the MCS, one connection is established for control and the second connection is established for data. As the meeting begins, the meeting host may initially have control of the meeting (i.e., by default). The meeting is operational between the endpoint and other endpoint devices, which followed a similar initiation protocol to join the meeting.

Figure 4:
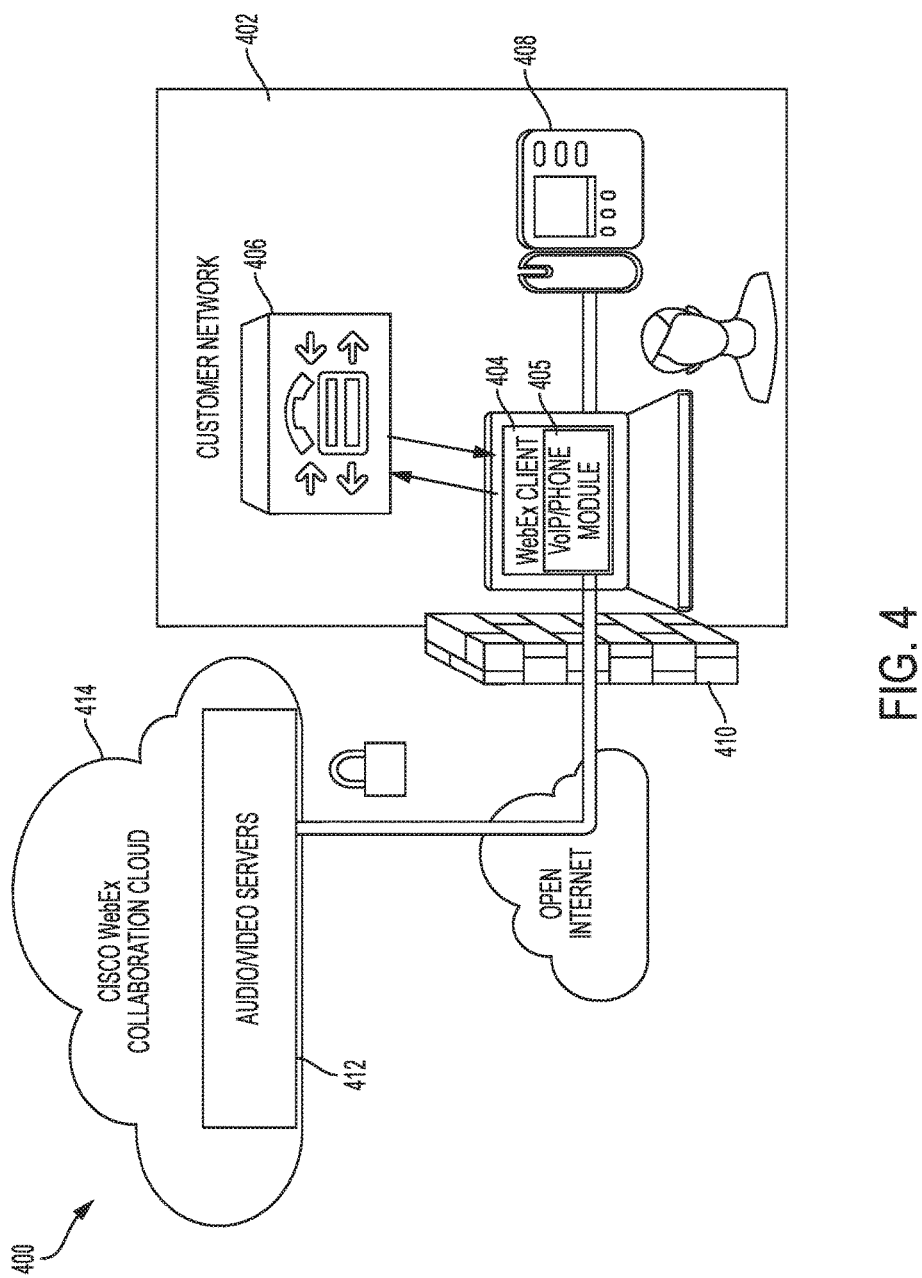
FIG. 4 is a simplified block diagram illustrating a communication system 400 in which techniques for performing telephone call back for a multimedia conferencing platform may be implemented.

FIG. 4 is a simplified block diagram illustrating a communication system 400 in which techniques for performing telephone call back for a multimedia conferencing platform may be implemented. As shown in FIG. 4, a customer network 402 includes a desktop application client 403 executing on a computing device 404, which in certain embodiments includes a hybrid VoIP/phone module 405, a call manager 406 (which may be implemented as a Cisco Unified Call Manager ("CUCM")), and an SIP telephone 408, all disposed behind a firewall 410 on customer-controlled premises. In accordance with features of embodiments described herein, a user joins a conferencing session, which will be assumed for the sake of example to be a WebEx session, using the desktop client 403 behind the firewall 410. One or more audio/video servers 412, including one or more MCSes, are disposed in a collaboration cloud 414 for hosting audio/video conferencing sessions, such as WebEx sessions. The audio/video servers 412 may be capable of both audio switching and audio mixing; however, in the interest of lowering costs, one or more switching-only servers may be utilized to implement the features described herein.

In accordance with features of certain embodiments, the hybrid VoIP/phone module 405 of the desktop client 403 is capable of registering to the call manager 406 masquerading as an IP phone. The hybrid VoIP/phone module 405 is also capable of connecting to audio/video server(s) 412 in the collaboration cloud 414 and performing audio transcoding from simple (e.g., G.711) to complex (e.g., OPUS codec), and audio mixing, including mixing multiple audio streams from audio video servers. The hybrid VoIP/phone module 405 is further capable of processing call back numbers provided by the user via an appropriate user interface, and providing a gateway for the IP phone 408 to the audio/video server(s) 412 in the collaboration cloud 414.

As will be described in greater detail below, the hybrid VoIP/phone module 405 in the customer network 402 may establish an encrypted audio connection tunnel 416 through the firewall 410 to one of the audio/video servers 412 in the collaboration cloud 414. The hybrid VoIP/phone module 405 calls the IP phone 408 through the call manager 406, which returns the IP phone route to the module. The hybrid VoIP/phone module 405 then calls the IP phone 408 such that when the user answers, the IP phone is connected to the audio/video server via the hybrid VoIP/phone module.

Figure 5A:
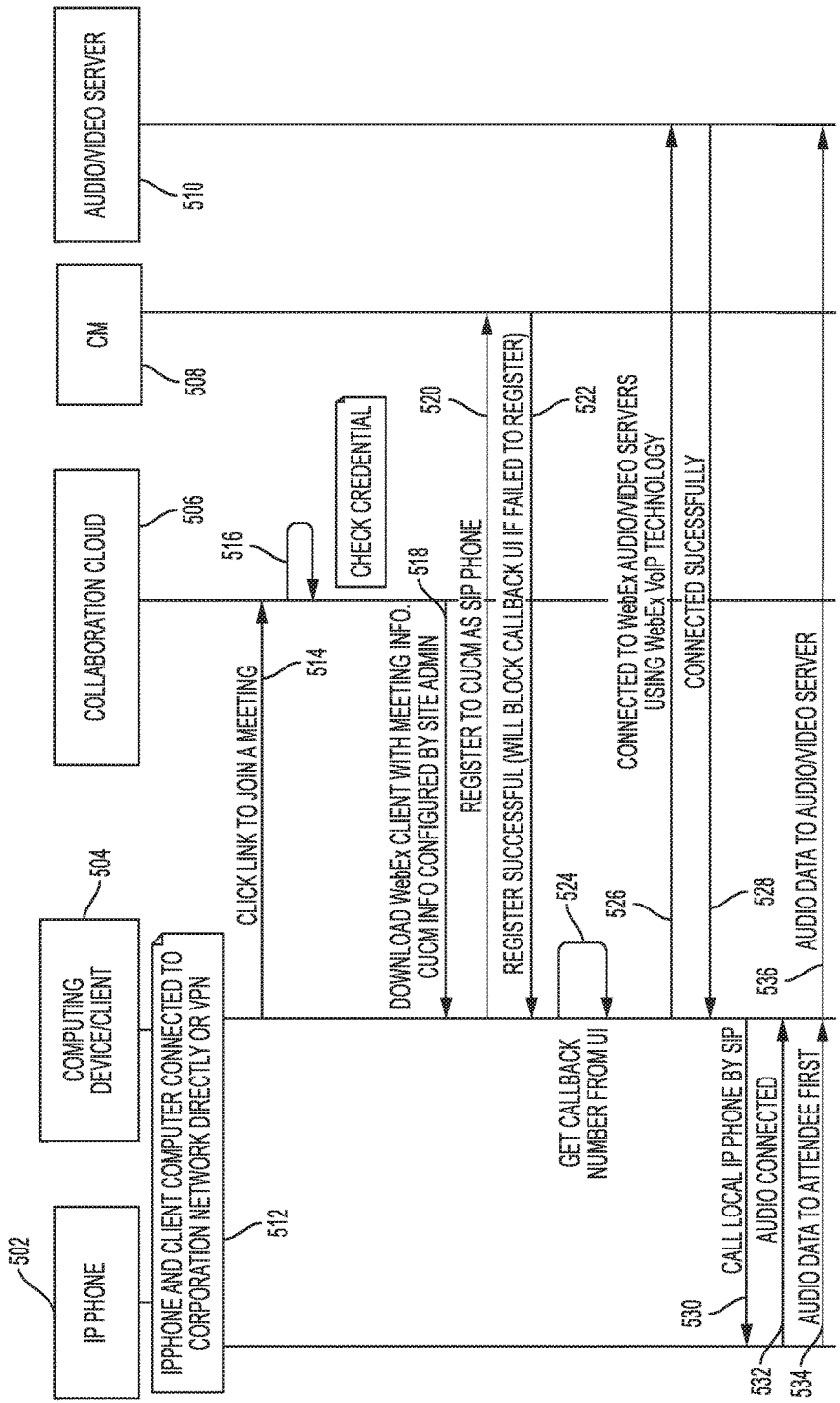
FIG. 5A is a flow diagram illustrating steps that may be taken in implementing techniques for performing telephone call back for a multimedia conferencing platform in accordance with features of embodiments described herein.

FIG. 5A is a flow diagram illustrating steps that may be taken in implementing techniques for performing telephone call back for a multimedia conferencing platform in accordance with features of embodiments described herein. In particular, FIG. 5A illustrates interaction between and among various system elements, including an IP phone 502, a computer device 504 on which a collaboration client (such as a WebEx client) may execute, a collaboration cloud 506, a call manager 508, and an audio/video server 510 disposed in the collaboration cloud 506. It will be recognized that, as denoted in a box 512, the IP phone 502 and the computer device 504 are connected to a customer network (e.g., network 402 (FIG. 4)) either directly or via a Virtual Private Network ("VPN"). In step 514, a user clicks a link of displayed in a graphical user interface ("GUI") on the computer device 504 to join a meeting, or conference, which information is conveyed to the collaboration cloud 506. In step 516, the collaboration cloud 506 (or more particularly, an authentication and/or configuration function within the collaboration cloud 506) checks the credentials of the user provided by the computer device 504 and in step 518 downloads to the computer device a collaboration client (e.g., a WebEx client), including the hybrid VoIP/phone module, with meeting information and call manager information as configured by a site administrator.

In step 520, the collaboration client executing on the computing device 504 registers to the call manager 508 as an IP phone. In step 522, the call manager 508 indicates to the collaboration client at the computing device 504 that registration has been successful. It will be noted that if registration is not successful, a call back user interface will be blocked. In step 524, the collaboration client at the computing device 504 obtains a call back number for the IP phone 502, which is entered by a user via a GUI of the client (illustrated below). In step 526, the collaboration client connects to the audio/video server 510 using VoIP technology. In step 528, the collaboration client receives notification from the audio/video server 510 that the connection has been successful. In step 530, the collaboration client 504 calls the IP phone 502 using SIP. In step 532, the client receives notification that audio is connected. In step 534, audio data is provided from IP phone 502 to the client 504 and in 536, audio data is provided from the client 504 to the audio/video server 510. Similarly, audio data is provided from the audio/video server 510 to the client 504 and then from the client 504 to the IP phone 502. In this manner, the client 504 serves as a sort of gateway between the IP phone 502 and the audio/video server 510 to facilitate the call.

Figure 5B:
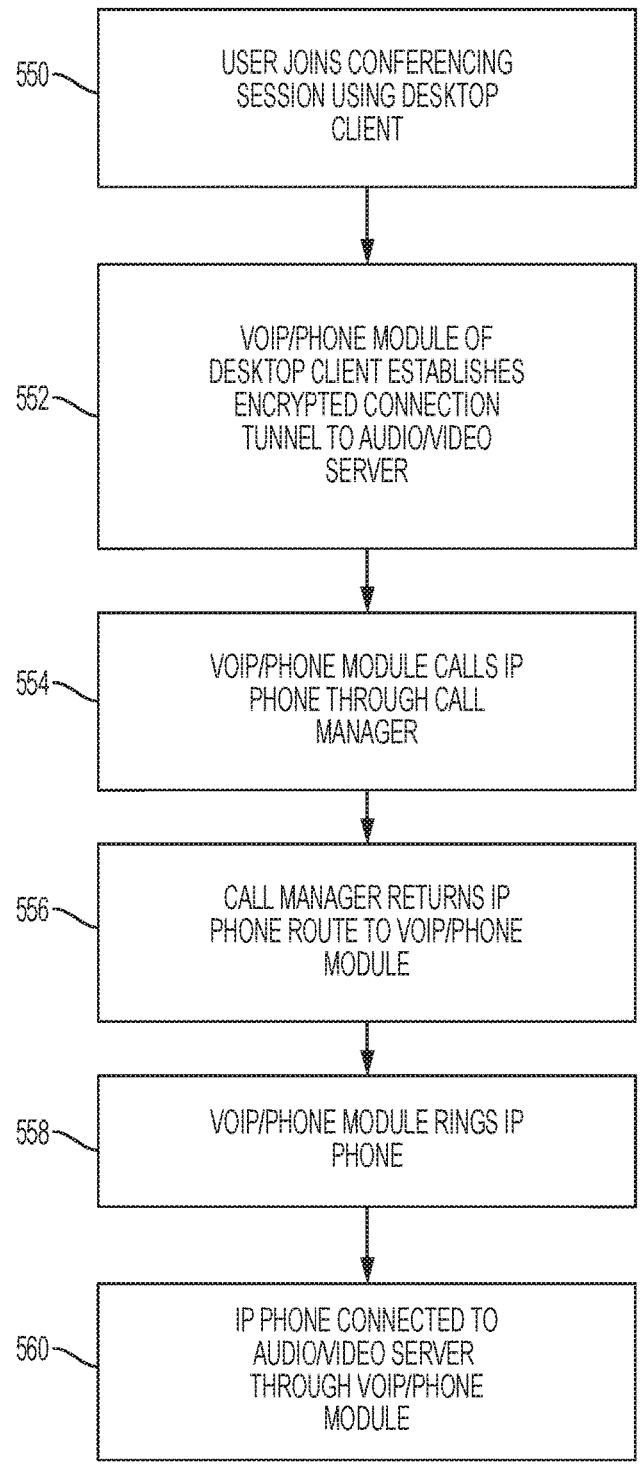
FIG. 5B is an alternative flow diagram illustrating steps that may be taken in implementing techniques for performing telephone call back for a multimedia conferencing platform in accordance with features of embodiments described herein.

FIG. 5B is an alternative flow diagram illustrating steps that may be taken in implementing techniques for performing telephone call back for a multimedia conferencing platform in accordance with features of embodiments described herein. Referring to FIG. 5B, in step 550, a user joins a conferencing session using a desktop client. In step 552, the VoIP/Phone module establishes an encrypted connection tunnel through the firewall to the audio/video server in the cloud. In step 554, the WebEx VoIP/Phone module calls the IP phone through a call manager, which may be implemented as CUCM. In step 556, the call manager returns the IP phone route. In step 558, the WebEx VoIP/Phone module rings the IP phone. In step 560, after the user answers the IP phone, the IP phone is connected to the audio/video server in the cloud via the WebEx VoIP/Phone module.

Figure 6:
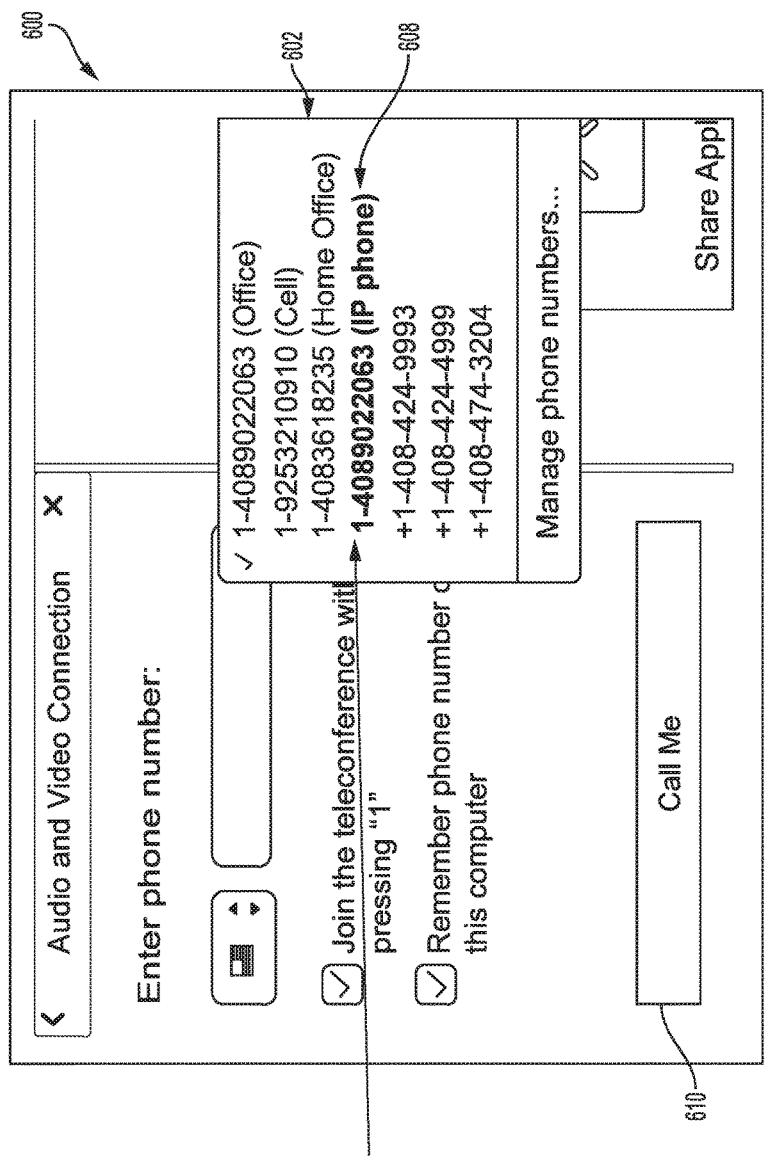
FIG. 6 illustrates a Call Me dialog box of a user interface of a multimedia conferencing platform in which techniques for performing telephone call back may be implemented in accordance with features described herein.

FIG. 6 illustrates a Call Me dialog box 600 of a user interface of a multimedia conferencing platform in which techniques for performing telephone call back may be implemented in accordance with features described herein. As shown in FIG. 6, the dialog box 600 prompts the user to select a call back number from a drop down list of numbers 602 that have been previously configured as will be described in detail with reference to FIG. 7 below. In accordance with features of embodiments described herein, a phone number for an IP phone, such as IP phone 502 (FIG. 5), designated in FIG. 6 by a reference numeral 608, is included in the list 602 and may be selected by a user as the call back number. Once the number 608 is selected, call back is initiated by the user's clicking a "Call Me" button 610.

Figure 7:
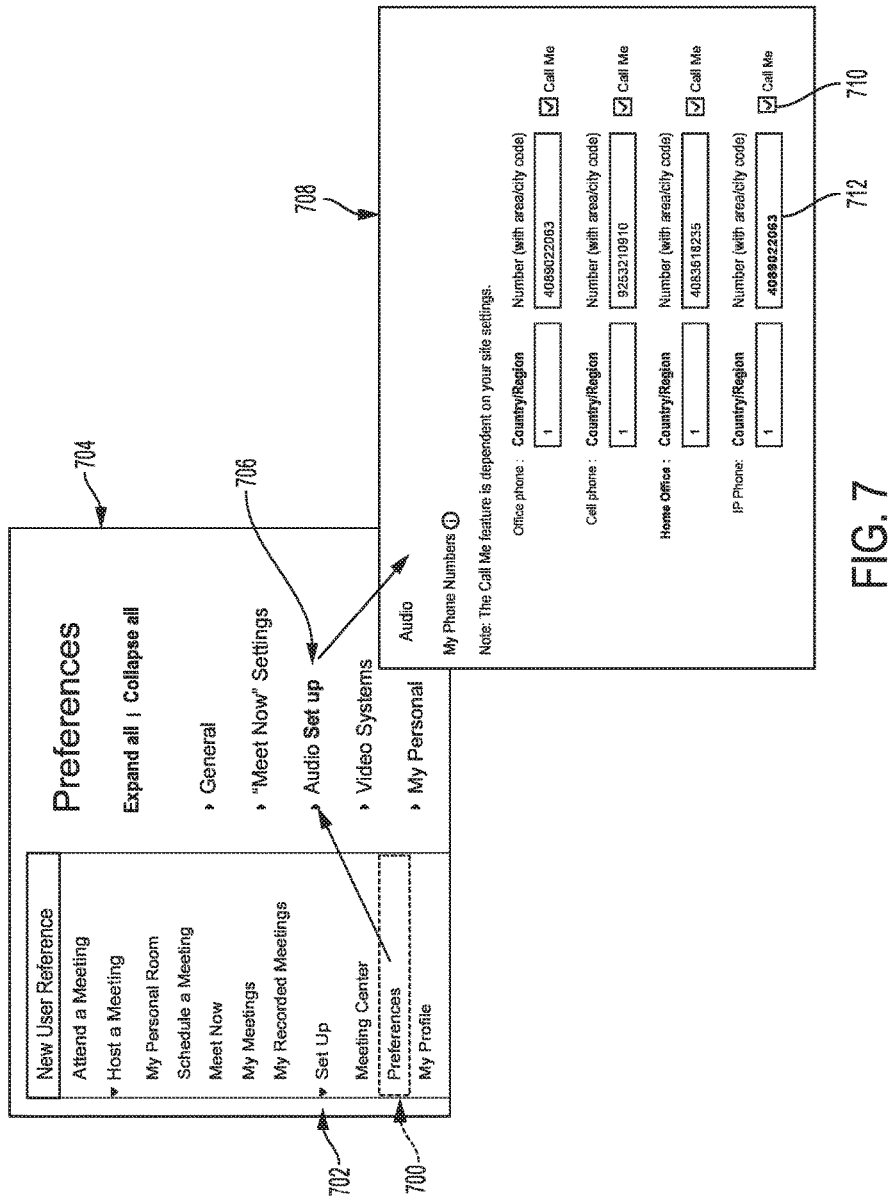
FIG. 7 illustrates a portion of a user interface for adding numbers to a Call Me list of a multimedia conferencing platform in which techniques for performing telephone call back may be implemented in accordance with features described herein.

It will be recognized that users have the ability to add numbers to and have numbers displayed in their Call Me list (shown in FIG. 6). FIG. 7 illustrates a manner in which numbers may be added to the Call Me list. In particular, to manage his/her Call Me list, the user first clicks a "Preferences" menu item 700 from a Set Up menu 702, which results in display of a Preferences menu 704. From the Preferences menu 704, selection of an "Audio Set Up" menu item 706 results in display of an audio set up dialog 708. The user can add numbers to/remove numbers from the Call Me list by selecting or unselecting a "Call Me" box associated with the particular number. As shown in FIG. 7, all of the numbers displayed in the dialog 708 are selected to be displayed in the Call Me list. In particular, a Call Me box 710 associated with the IP Phone number, displayed in a field 712, is selected so that the IP Phone number will be displayed in and selected from the Call Me list (FIG. 6).

By deploying a meeting client-assisted call back to an IP phone, an improved way to perform call-back is disclosed. This method dramatically decreases the cost of the service, providing a better joining experience as compared to calling in. The meeting client works as a gateway to the audio conference for the IP phone, so no enterprise edge router/switch is needed. Embodiments described herein work with all kinds of firewalls and proxy configurations just like a regular WebEx meeting. Meeting clients perform as distributed audio mixing and transcoding platform for the audio conference, dramatically decreasing the server computing power requests. Techniques described herein require very low operating cost for call back services, meaning users will get low cost callback for better audio joining experience. The meeting client may also work as a personal edge router for all kids of audio, video, and data sharing devices, can reduce the computing power requests for media server, like video codex transcoding, in the cloud, thereby cutting the cost in cloud service.

Embodiments described herein enable a meeting client to function as a gateway to an audio conference for an IP phone; as a result, no enterprise edge routers or switches are needed. The embodiments function with all types of firewalls, using a proxy configuration the same as a regular meeting. Embodiments described herein further enable a meeting client to perform distributed audio mixing and transcoding for the audio conference, dramatically decreasing the server computing power requirements. Additionally, embodiments described herein have a very low operating cost for callback services (in some instances, even lower than regular call-in service), resulting in users receiving lower cost call back with better audio joining experiences. Moreover, the meeting client may function as a personal edge router for all types of audio, video, and data sharing services and can reduce the computing power requests for media servers, such as video codec transcoding, in the cloud, cutting cloud service costs.

It will be recognized that the various computing devices and servers, such as computing devices 404 and 504, shown in the drawings may be implemented using one or more computer devices comprising software embodied in one or more tangible media for facilitating the activities described herein. The computer devices for implementing the elements may also include a memory device (or memory element) for storing information to be used in achieving the functions as outlined herein. Additionally, the computer devices may include one or more processors capable of executing software or an algorithm to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, various functions outlined herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 8:
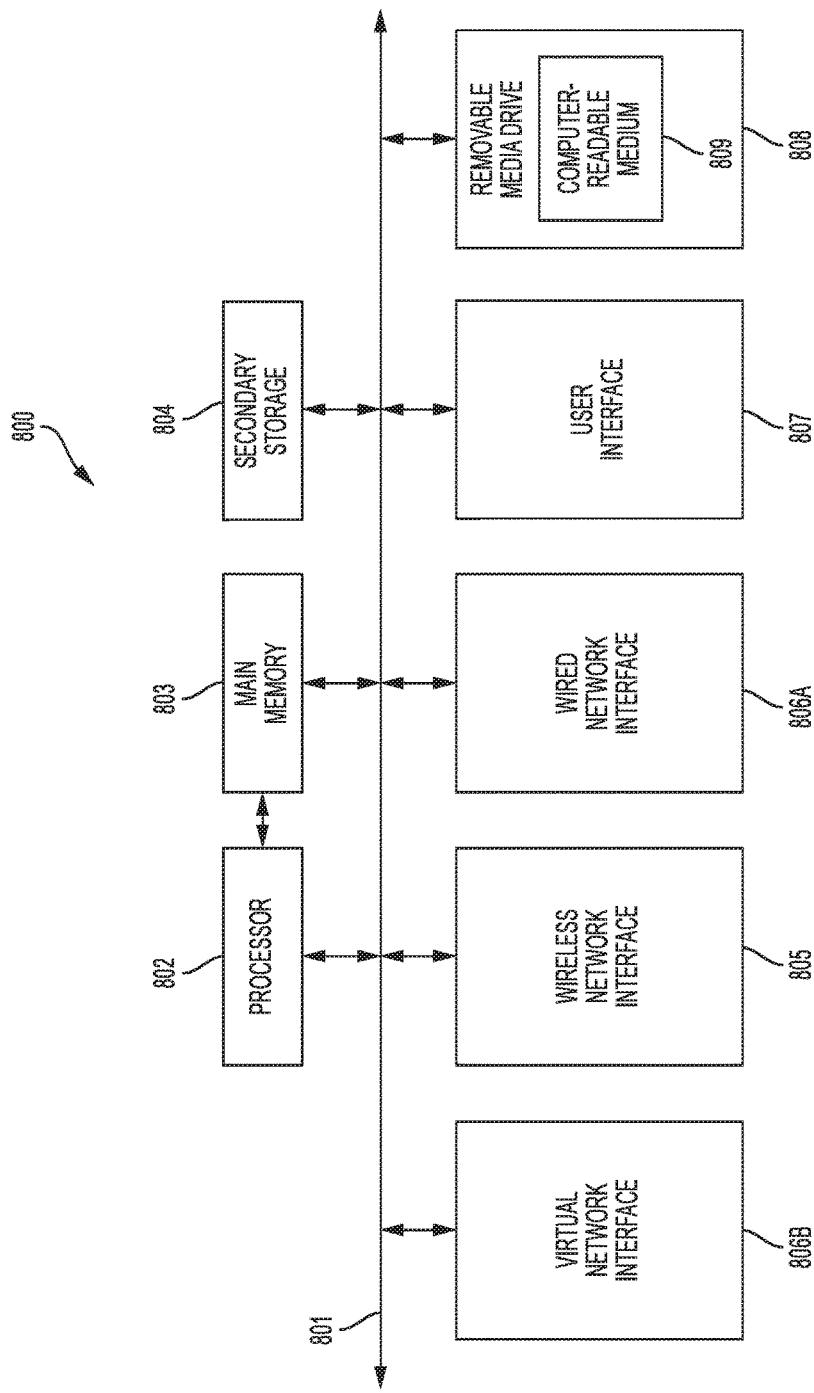
FIG. 8 is a simplified block diagram of a machine comprising an element of a multimedia conferencing platform in which techniques for performing telephone call back may be implemented in accordance with features described herein.

Turning to FIG. 8, illustrated therein is a simplified block diagram of an example machine (or apparatus) 800, which in certain embodiments may comprise the computing device 404 and/or 504 (FIGS. 4 and 5), that may be implemented in embodiments illustrated in and described with reference to the FIGURES provided herein. The example machine 800 corresponds to network elements and computing devices that may be deployed in environments illustrated in described herein. In particular, FIG. 8 illustrates a block diagram representation of an example form of a machine within which software and hardware cause machine 800 to perform any one or more of the activities or operations discussed herein. As shown in FIG. 8, machine 800 may include a processor 802, a main memory 803, secondary storage 804, a wireless network interface 805, a wired network interface 806A, a virtual network interface 806B, a user interface 807, and a removable media drive 808 including a computer-readable medium 809. A bus 801, such as a system bus and a memory bus, may provide electronic communication between processor 802 and the memory, drives, interfaces, and other components of machine 800. Machine 800 may be a physical or a virtual appliance, for example a virtual router running on a hypervisor or running within a container.

Processor 802, which may also be referred to as a central processing unit ("CPU"), can include any general or special-purpose processor capable of executing machine readable instructions and performing operations on data as instructed by the machine readable instructions. Main memory 803 may be directly accessible to processor 802 for accessing machine instructions and may be in the form of random access memory ("RAM") or any type of dynamic storage (e.g., dynamic random access memory ("DRAM")). Secondary storage 804 can be any non-volatile memory such as a hard disk, which is capable of storing electronic data including executable software files. Externally stored electronic data may be provided to computer 800 through one or more removable media drives 808, which may be configured to receive any type of external media such as compact discs ("CDs"), digital video discs ("DVDs"), flash drives, external hard drives, etc.

Wireless, wired, and virtual network interfaces 805, 806A and 806B can be provided to enable electronic communication between machine 800 and other machines or nodes via networks. In one example, wireless network interface 805 could include a wireless network controller ("WNIC") with suitable transmitting and receiving components, such as transceivers, for wirelessly communicating within a network. Wired network interface 806A can enable machine 800 to physically connect to a network by a wire line such as an Ethernet cable. Both wireless and wired network interfaces 805 and 806A may be configured to facilitate communications using suitable communication protocols such as, for example, Internet Protocol Suite ("TCP/IP"). Machine 800 is shown with both wireless and wired network interfaces 805 and 806A for illustrative purposes only. While one or more wireless and hardwire interfaces may be provided in machine 800, or externally connected to machine 800, only one connection option is needed to enable connection of machine 800 to a network.

A user interface 807 may be provided in some machines to allow a user to interact with the machine 800. User interface 807 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, and an application programming interface (API), etc.

Removable media drive 808 represents a drive configured to receive any type of external computer-readable media (e.g., computer-readable medium 809). Instructions embodying the activities or functions described herein may be stored on one or more external computer-readable media. Additionally, such instructions may also, or alternatively, reside at least partially within a memory element (e.g., in main memory 803 or cache memory of processor 802) of machine 800 during execution, or within a non-volatile memory element (e.g., secondary storage 804) of machine 800. Accordingly, other memory elements of machine 800 also constitute computer-readable media. Thus, "computer-readable medium" is meant to include any medium that is capable of storing instructions for execution by machine 800 that cause the machine to perform any one or more of the activities disclosed herein.

Not shown in FIG. 8 is additional hardware that may be suitably coupled to processor 802 and other components in the form of memory management units ("MMU"), additional symmetric multiprocessing elements, physical memory, peripheral component interconnect ("PCI") bus and corresponding bridges, small computer system interface ("SCSI")/integrated drive electronics ("IDE") elements, etc. Machine 800 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 800 to appropriately manage the operation of the hardware components therein.

The elements, shown and/or described with reference to machine 800, are intended for illustrative purposes and are not meant to imply architectural limitations of machines such as those utilized in accordance with the present disclosure. In addition, each machine may include more or fewer components where appropriate and based on particular needs and may run as virtual machines or virtual appliances. As used herein in this Specification, the term "machine" is meant to encompass any computing device or network element such as servers, virtual servers, logical containers, routers, personal computers, client computers, network appliances, switches, bridges, gateways, processors, load balancers, wireless LAN controllers, firewalls, or any other suitable device, component, element, or object operable to affect or process electronic information in a network environment.

In one example implementation, certain network elements or computing devices may be implemented as physical and/or virtual devices and may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory can store data used for the various operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of environments illustrated herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environments described herein could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that embodiments described herein, as shown in the FIGURES, and teachings thereof are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    receiving, via a client application executing on a computer device, a request to participate in a web-based conferencing session using both the computer device and a first IP phone that is separate from the computer device, wherein the computer device and the first IP phone are each connected to a first customer network, and wherein the web-based conferencing session is hosted by an audio/video server in a collaboration cloud environment that is separate from the first customer network, and wherein the request to participate in the web-based conferencing session is initiated by a user via the client application executing on the computer device;
    establishing an encrypted connection between the client application and the audio/video server;
    registering the client application to a call manager as an IP phone;
    receiving, via a user interface by the computer device, a call-back number for the first IP phone;
    calling, by the client application, the first IP phone via the call-back number to establish an audio connection between the client application executing on the computer device and the first IP phone;
    receiving, at the client application, audio data from the first IP phone via the audio connection; and sending, by the client application, the audio data received from the first IP phone to the audio/video server;

prior to establishing a connection with the first IP phone, checking credentials of a user associated with the request to participate in the web-based conferencing session to determine whether the user is authorized to join the web-based conferencing session.

2. The method of claim 1, wherein the first IP phone and the computer device are each connected to the customer network via a virtual private network (VPN).

3. The method of claim 1, wherein the first IP phone and the computer device are disposed on an opposite side of a firewall from the audio/video server.

4. The method of claim 1, wherein calling the first IP phone via the call-back number to establish an audio connection comprises:

calling the first IP phone via the Session Initiation Protocol (SIP).

5. The method of claim 4, wherein establishing an encrypted connection between the client application executing on the computer device and the audio/video server comprises:

connecting to the audio/video server using Voice over Internet Protocol (VoIP) technology.

6. The method of claim 1, further comprising presenting by the computer device via the client application a web-portion of the web-based conferencing session, wherein an audio portion of the web-based conferencing session includes the audio data.

7. The method of claim 1, further comprising:

mixing by the computer device audio data received from the server; and sending the mixed audio data to the first IP phone.

8. One or more non-transitory tangible media that includes code for execution and when executed by a processor is operable to perform operations comprising:

receiving, via a client application executing on a computer device, a request to participate in a web-based conferencing session using both the computer device and a first IP phone that is separate from the computer device, wherein the computer device and the first IP phone are each connected to a first customer network, and wherein the web-based conferencing session is hosted by an audio/video server in a collaboration cloud environment that is separate from the first customer network, wherein the request to participate in the web-based conferencing session is initiated by a user via the client application executing on the computer device;

establishing an encrypted connection between the client application and the audio/video server;

registering the client application to a call manager as an IP phone;

receiving, via a user interface by the computer device, a call-back number for the first IP phone;

calling, by the client application, the first IP phone via the call-back number and the Session Initiation Protocol (SIP) to establish an audio connection between the client application executing on the computer device and the first IP phone;

receiving, at the client application, audio data from the first IP phone via the audio connection; and sending, by the client application, the audio data received from the first IP phone to the audio/video server.

9. The media of claim 8, wherein the first IP phone and the computer device are each connected to the customer network via a virtual private network (VPN).

10. The media of claim 9, wherein the first IP phone is disposed on an opposite side of a firewall from the audio/video server.

11. The media of claim 8, wherein the operations further comprise, prior to establishing a connection with the first IP phone, checking credentials of a user associated with the request to participate in the web-based conferencing session to determine whether the user is authorized to join the web-based conferencing session.

12. The media of claim 8, wherein establishing an encrypted connection between the client application executing on the computer device and the audio/video server comprises:

connecting to the audio/video server using Voice over Internet Protocol (VoIP) technology.

13. The media of claim 8, further wherein the operations further comprise presenting by the computer device via the client application a web-portion of the web-based conferencing session, wherein an audio portion of the web-based conferencing session includes the audio data.

14. The media of claim 8, wherein the operations further comprise mixing by the computer device audio data received from the server; and sending the mixed audio data to the first IP phone.

15. An apparatus comprising:

a memory element configured to store data;

a processor operable to execute instructions associated with the data; and a VoIP/phone module configured to:

receive, via a client application executing on the apparatus, a request to participate in a web-based conferencing session using both the apparatus and a first IP phone that is separate from the apparatus, wherein the apparatus and the first IP phone are each connected to a first customer network, and wherein the web-based conferencing session is hosted by an audio/video server in a collaboration cloud environment that is separate from the first customer network, and wherein the first IP phone and the apparatus are each connected to the customer network via a virtual private network (VPN);

establish an encrypted connection between the client application and the audio/video server;

register the client application to a call manager as an IP phone;

receive, via a user interface by the apparatus, a call-back number for the first IP phone;

call, by the client application, the first IP phone via the call-back number and the first IP phone via the Session Initiation Protocol (SIP) to establish an audio connection between the client application and the IP phone;

receive, at the client application, audio data from the first IP phone via the audio connection; and send, by the client application, the audio data received from the first IP phone to the audio/video server.

16. The apparatus of claim 15, wherein the request to participate in the web-based conferencing session is initiated by a user via the client application executing on the apparatus.

17. The apparatus of claim 15, wherein the VoIP/phone module is further configured to, prior to establishing a connection with the first IP phone, check credentials of a user associated with the request to participate in the web-based conferencing session to determine whether the user is authorized to join the web-based conferencing session.

18. The apparatus of claim 15, wherein to establish an encrypted connection between the client application executing on the apparatus and the audio/video server, the VoIP/phone module is configured to:
   connect to the audio/video server using Voice over Internet Protocol (VoIP) technology.

19. The apparatus of claim 15, wherein the VoIP/phone module is further configured to:
   present, via the client application, a web-portion of the web-based conferencing session, wherein an audio portion of the web-based conferencing session includes the audio data.

20. The apparatus of claim 15, wherein the VoIP/phone module is further configured to:
   mix audio data received from the server; and
   send the mixed audio data to the first IP phone.

* * * * *